United States Patent
Howell et al.

(10) Patent No.: US 10,230,524 B2
(45) Date of Patent: Mar. 12, 2019

(54) SECURELY TRANSFERRING USER INFORMATION BETWEEN APPLICATIONS

(71) Applicant: Wickr Inc., San Francisco, CA (US)

(72) Inventors: Christopher Howell, Freehold, NJ (US); Thomas Michael Leavy, River Edge, NJ (US)

(73) Assignee: Wickr Inc., San Francisco, CA (US)

( * ) Notice: Subject to any disclaimer, the term of this patent is extended or adjusted under 35 U.S.C. 154(b) by 155 days.

(21) Appl. No.: 15/447,741

(22) Filed: Mar. 2, 2017

(65) Prior Publication Data

US 2018/0212771 A1 Jul. 26, 2018

Related U.S. Application Data

(60) Provisional application No. 62/450,968, filed on Jan. 26, 2017.

(51) Int. Cl.
*H04L 29/06* (2006.01)
*H04L 9/08* (2006.01)
(Continued)

(52) U.S. Cl.
CPC ............ *H04L 9/0894* (2013.01); *H04L 9/083* (2013.01); *H04L 9/085* (2013.01); *H04L 9/0822* (2013.01);
(Continued)

(58) Field of Classification Search
CPC ..... H04L 9/0822; H04L 9/083; H04L 9/0844; H04L 9/085; H04L 9/0863; H04L 9/0869; H04L 9/14; H04L 9/2066; H04L 9/3247
See application file for complete search history.

(56) References Cited

U.S. PATENT DOCUMENTS

2007/0003066 A1 1/2007 Schwartz et al.
2009/0052660 A1 2/2009 Chen et al.
(Continued)

FOREIGN PATENT DOCUMENTS

WO 0079368 A1 12/2000
WO 2018002856 A1 1/2018

OTHER PUBLICATIONS

UKIPO Search & Examination Report, dated Jul. 9, 2018.

*Primary Examiner* — Jeffrey C Pwu
*Assistant Examiner* — Thong P Truong
(74) *Attorney, Agent, or Firm* — LaForgia Law, P.C.

(57) ABSTRACT

The present disclosure describes a system, method, and non-transitory computer readable medium for provisioning multiple instances of a secure communication application on multiple devices. A secure communication application on a first device generates a first set of private keys that are associated with the user and a second set of keys that are associated with the secure communication application executing on the first device. The first set of private keys establishes a set of root identifying keys for the user that are identical for all installations of the secure communication application, while the second set of keys will vary from device to device. In this regard, the first set of root identifying keys must be securely transferred from the first device to any subsequent installations of the secure communication application on one or more second devices. This establishes a high degree of trust since each installation of the secure communication application is linked to the first set of root identifying keys and allows the user to send and receive encrypted communications on multiple devices from the same trusted root keys.

18 Claims, 14 Drawing Sheets

(51) Int. Cl.
*H04L 9/14* (2006.01)
*H04L 9/32* (2006.01)
*H04L 9/30* (2006.01)

(52) U.S. Cl.
CPC .......... *H04L 9/0844* (2013.01); *H04L 9/0863* (2013.01); *H04L 9/0869* (2013.01); *H04L 9/14* (2013.01); *H04L 9/3066* (2013.01); *H04L 9/3247* (2013.01)

(56) References Cited

U.S. PATENT DOCUMENTS

| | | |
|---|---|---|
| 2016/0072785 A1 | 3/2016 | Statica et al. |
| 2016/0127331 A1 | 5/2016 | Liu et al. |
| 2016/0164854 A1 | 6/2016 | Lerman et al. |
| 2016/0350238 A1* | 12/2016 | Ford .................. G06F 12/1408 |
| 2016/0380937 A1 | 12/2016 | Murphy et al. |
| 2017/0012950 A1 | 1/2017 | Kim et al. |
| 2017/0048066 A1 | 2/2017 | Atley et al. |

\* cited by examiner

SECURELY TRANSFERRING USER INFORMATION BETWEEN APPLICATIONS

CROSS-REFERENCE TO RELATED APPLICATIONS

This application claims priority to U.S. Provisional Application No. 62/450,968, entitled, "Secure Communication Protocol," filed Jan. 26, 2017, the entirety of which is herein incorporated by reference. This application is also related to U.S. application Ser. No. 15/447,749, entitled, "Secure Configuration of an Application," filed concurrently herewith, the entirety of which is herein incorporated by reference.

BACKGROUND OF THE INVENTION

Users are installing communication applications, such as messaging and calling applications, on multiple devices in order to stay connected with friends, family, co-workers, clients, and customers. Some of these communication applications allow users to exchange encrypted communications. As part of the enrollment process for these communication applications, the application may derive private keys specific to the user. These private keys are to remain known only to the end user and may be used to establish a root of trust. In this regard, any subsequent installation of a communication application poses a security risk during the transfer of the private keys from the first installation to any subsequent installation. That is, if the private keys were to be acquired by a malicious user, the malicious user would be able to imitate the legitimate user and create their own instance of the communication application. This would allow the malicious user to send messages on the legitimate user's behalf and/or eavesdrop on the legitimate user's conversations. Thus, there is a need in the art to allow a legitimate user to securely transfer their private keys from a first installation of a secure communication application to a subsequent installation of a secure communication application.

BRIEF SUMMARY OF THE INVENTION

The present application describes a system that includes a processor and a memory that includes instructions. The processor is configured to execute an enrollment process that includes deriving a root user identifier, a root identity key pair, a root private key, a remote storage root key, a node storage root key, and an escrow key. The processor encrypts the root private key, the remote storage root key, and the node storage root key with the escrow key. The escrow key is then encrypted with a password-based key that is derived according to a password-based key derivation function. The processor than creates a key escrow bundle that includes the encrypted root private key, the encrypted remote storage root key, and the encrypted node storage root keys and transmits the root user identifier, a root public key, and the key escrow bundle to a server. In some examples, the encrypted escrow key is included in the key escrow bundle transmitted to the server.

According to another example of the present application, a method includes executing an enrollment process that includes deriving a root user identifier, a root identity key pair, a root private key, a remote storage root key, a node storage root key, and an escrow key. The method encrypts the root private key, the remote storage root key, and the node storage root key with the escrow key and then encrypts the escrow key with a password-based key that is derived according to a password-based key derivation function. The method creates a key escrow bundle that includes the encrypted root private key, the encrypted remote storage root key, and the encrypted node storage root keys and transmits the root user identifier, a root public key, and the key escrow bundle to a server.

Another example of the present disclosure includes a non-transitory computer readable medium that includes instructions for executing an enrollment process. As part of the enrollment a root user identifier, a root identity key pair, a root private key, a remote storage root key, a node storage root key, and an escrow key are derived. The root private key, the remote storage root key, and the node storage root key are encrypted using the escrow key. The escrow key is then encrypted a password-based key that is derived according to a password-based key derivation function. After the keys are encrypted, a key escrow bundle is created and transmitted to a first server.

According to yet another example, the present disclosure describes a system that includes a processor and a memory. The processor is configured to retrieve the encrypted key escrow bundle from a server. In this regard, the processor requests, and subsequently receives, the encrypted key escrow bundle from the server. The key escrow bundle includes at least one of a root private key, a remote storage root key, a node storage root key, and an escrow key. Next, the processor obtains an escrow key, which is used to decrypt the encrypted key escrow bundle received from the server. Accordingly, the processor provisions a secure communication application on the device using the information contained in the decrypted key escrow bundle. In some examples, the encrypted key escrow bundle is uploaded to the server by a different device.

Another example of the present disclosure describes a method for retrieving an encrypted key escrow bundle from a server. The method begins with a request for a key escrow bundle being transmitted to the server from a client device. The client device receives an encrypted key escrow bundle from the server and obtains an escrow key, which is used to decrypt the encrypted key escrow bundle received from the server. A root private key, a remote storage node key, and a node storage root key are retrieved from the decrypted key escrow bundle. A secure communication application is configured on a secondary device using the root private key, the remote storage node key, and the node storage root key.

Another embodiment illustrated by the present disclosure includes a non-transitory computer readable medium that includes instructions for retrieving an encrypted key escrow bundle from a server. The instructions transmit a request for a key escrow bundle to the server from a client device. In response to the request, the client device receives an encrypted key escrow bundle from the server. The instructions include obtaining an escrow key that is used to decrypt the encrypted key escrow bundle received from the server. A root private key, a remote storage node key, and a node storage root key are obtained from the decrypted key escrow bundle and are used to configure a secondary device.

BRIEF DESCRIPTION OF THE DRAWINGS

Various embodiments of the invention are disclosed in the following detailed description and the accompanying drawings.

DETAILED DESCRIPTION

The present disclosure describes a system and method for provisioning multiple instances of a secure communication application on multiple devices. Once the multiple instances of the secure communication application are provisioned, the user will be able to send and receive encrypted communications across all their devices.

The present disclosure can be implemented in numerous ways, including as a process; an apparatus; a system; a composition of matter; a computer program product embodied on a non-transitory computer readable storage medium; and/or a processor, such as a processor configured to execute instructions stored on and/or provided by a memory coupled to the processor. These implementations, or any other form that the present disclosure may take, may be referred to as techniques. In general, the order of the steps of disclosed processes may be altered within the scope of the present disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the present disclosure is provided below along with accompanying figures that illustrate the principles of the present disclosure. The present disclosure is described in connection with such embodiments, but the present disclosure is not limited to any embodiment. The scope of the present disclosure is limited only by the claims and the present disclosure encompasses numerous alternatives, modifications, and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

Figure 1:
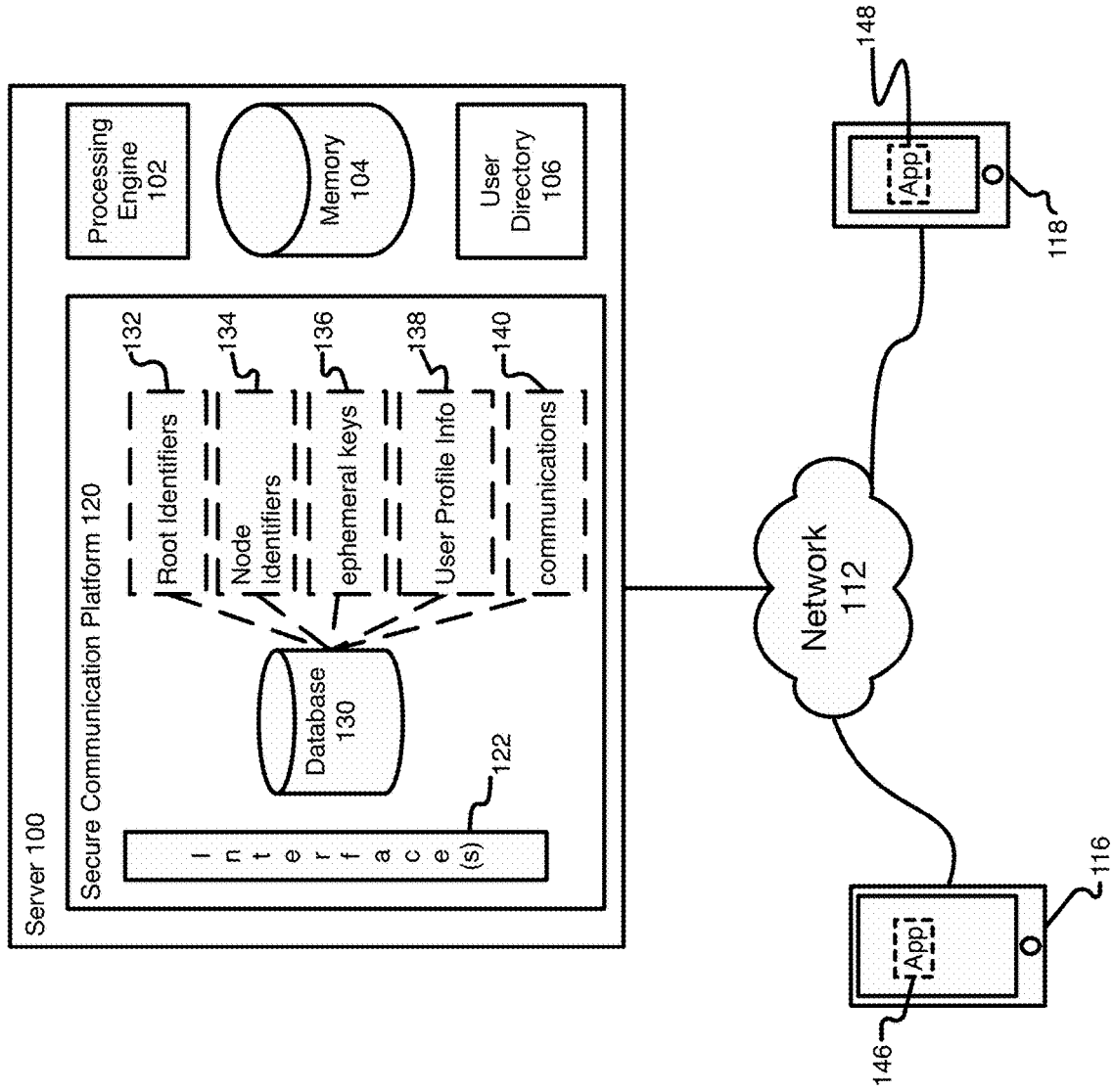
FIG. 1 illustrates an example of an environment where secure communications are exchanged.

FIG. 1 illustrates an embodiment of an environment in which secure communications are exchanged. Specifically, FIG. 1 shows a first client device 116 and a second client device 118 connected to secure communication platform 120, located on server 100, via network 112.

Typically, secure communications are exchanged using secure message datagrams, which encapsulate a sender's message. The datagram also allows information such as encryption information, hardware binding information, message security controls, and decryption information—for multiple receivers (as applicable)—to securely travel with the message. The secure message datagram also provides cross-platform support so that users may communicate regardless of their operating systems (e.g., Linux, iOS, and Windows), smart phone platforms (e.g., iPhone, Android, Windows, Blackberry, etc.), and device types (e.g., mobile smart phones, tablets, laptops, desktops, etc.). Using the techniques described herein, only intended accounts on intended devices are able to decrypt the messages. Thus, for example, the secure communication platform 120 is unable to decrypt messages. As will further be described in more detail below, using the techniques described herein, message participants can maintain a forward secret secure communication channel, whether communicating synchronously (e.g., where all participants are online or otherwise able to communicate with platform 120) or asynchronously (e.g., where at least one participant is offline or otherwise not in communication with platform 120).

As shown in FIG. 1, secure communication platform 120 may be implemented on server 100. Server 100 may include a processor 102, memory 104, user directory 106, and the secure communication platform 120. In this regard, server 100 may be a stand-alone server, a corporate server, or a server located in a server farm or cloud-computing environment. In some embodiments, the server 100 may be a cloud service provider running a virtual machine configured to provide secure communication platform 120 to an enterprise as a Software as a Service (SaaS).

Processor 102 may be any conventional processor capable of interacting with memory 104, user directory 106, and secure communication platform 120. In this regard, processor 102 may include a processor, a multiprocessor, a multicore processor, or any combination thereof. Alternatively, processor 102 may be a dedicated controller, such as an Application Specific Integrated Circuit (ASIC) or Field Programmable Gate Array (FPGA).

Memory 104 stores information accessible by processor 102, including instructions and data that may be executed or otherwise used by the processor 102. Memory 104 may be any type of media capable of storing information accessible by the processor, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Memory 104 may include short term or temporary storage as well as long term or persistent storage. According to some embodiments, memory 104 may include a storage area network (SAN) accessible by the secure communication platform 120.

User directory 106 may be any database or table capable of providing directory services. For example, user directory may include a corporate directory that include employees' first and last names, usernames, email address, phone numbers, department information, etc. Alternatively, user directory 106 may be a database or table to maintain user information for users of secure communication platform 120. In this regard, user directory 106 may be encrypted. In some embodiments, user directory 106 may serve as a secure directory that includes a table of hashed usernames, a table of appIDs, and a table of deviceIDs for a secure communication application. Accordingly, user directory 106 may be used to share information about users, systems, networks, services and applications. According to some embodiments, the user directory 106 may include a Lightweight Directory Access Protocol (LDAP).

Although FIG. 1 illustrates processor 102, memory 104, user directory 106, and secure communication platform 120 as being located on server 100, processor 102 and memory 104 may comprise multiple processors and memories that may or may not be stored within the same physical housing. For example, memory 104 may be a hard drive or other storage media located in a server farm of a data center, such as a storage area network (SAN). Accordingly, references to a processor, a computer, or a memory will be understood to include references to a collection of processors or computers or memories that may or may not operate in parallel. Further, the user directory 106 may be located in a separate physical housing from processing engine 102 and memory 104. Moreover, secure communication platform 120 may be distributed across multiple servers.

Secure communication platform 120 may be configured to facilitate the exchange of communications for users of a secure communication application. As used herein, "communications" and "messages" may take a variety of forms, including: text messages, chat room messages, control messages, commands, e-mails, documents, audiovisual files, Short Message Service messages (SMSes), voice calls (i.e., VOIP), and video calls. Additionally, the content of the messages and/or communications may pertain to electronic transactions, such as credit card security, password protection, directories, and storage drive protection, video on demand security, online gaming, gambling, electronic distribution of music, videos, documents, online learning systems, databases, cloud storage and cloud environments, bank transactions, voting processes, military communications, security of medical records, communication between medically implanted devices and doctors, etc. The exchange of messages and/or communications is explained in further detail below.

Secure communication platform 120 may provide encrypted communications that easily integrate into and secure existing systems while providing compliant and secure communications. In this regard, secure communication platform 120 may integrate with existing identity systems, such as user directory 106. Further, secure communication platform 120 may include built-in support for enterprise data retention and support systems.

Secure communication platform 120 may also include database 130. Database 130 may be a relational database that stores information in a variety of tables. In this regard, database 130 may include a record for each user of platform 120 to allow users to find other users and communicate with others. Accordingly, database 130 may include a table of root identifiers 132, a table of node identifiers 134, a pool of ephemeral keys 136, and a table of user profile information 138, that include users' key escrow bundles. Additionally, user profile information may store privacy mode and privacy list entries to control with whom the user may communicate. Additionally, database 130 may include a table of communications 140. That is, the secure communication platform may store communications for a predetermined time in table 140. For example, when a communication is received, the secure communication platform may store the communication in the table of communications 140 and provide an alert, such as a push notification, to the receiver. Accordingly, a receiver may access the secure communication platform to obtain his or her communications stored in table 140. In preferred embodiments, table 140 may store communications for 30 days; however, this may be adjusted, as needed, based on industry standards and/or to comply with regulatory schemes.

While a database is shown in FIG. 1, other techniques can be used to store the information used by platform 120 to facilitate the exchange of encrypted communications. For example, the table of communications may be stored in a separate storage, such as memory 104, instead of being stored within database 130. Alternatively, the information contained in the database 130 may be divided between database 130 and user directory 106. In this regard, database 130 and user directory 106 may interface to exchange information. Further, additional information can be securely stored on platform 120, whether in database 130 or another appropriate location.

Secure communication platform 120 may include one or more interface(s) 122 for communicating with the first client device 116 and the second client device 118. As one example, platform 120 may provide an application programming interface (API) configured to communicate with applications installed on client devices. Platform 120 may also provide other types of interfaces, such as a web interface, or stand-alone software programs for desktops and laptops, running on various Operating Systems (OSes). The web interface may allow users of client devices to exchange communications securely (whether with one another or other users), without the need for a separately installed communication application. The standalone software program may allow users to exchange secure communications via software that is downloaded by each user. According to some embodiments, platform 120 may make available a master clock time available via the one or more interface(s) 122. The master clock time may be used by client applications to enforce secure time-to-live (TTL) values of messages. The TTL values can be used to enforce (e.g., on behalf of a message sender) time constraints on communication access (e.g., by a receiver).

Users of client devices, such as client devices 116 and 118, may communicate securely with one another using the techniques described herein. For example, the first client device 116 and the second client device 118 may make use of the secure communication platform 120 and the techniques described herein via a secure communication application 146 and 148, respectively. As shown in FIG. 1, client devices may be mobile devices, such as a laptops, smart phones, or tablets, or computing devices, such as desktop computers or servers. As noted above, the secure communication application described herein allows cross-platform communications, thereby allowing users of various devices to communicate seamlessly. Further, each user may have different instances of the communication application across multiple devices. That is, the user of device 116 may be able to receive messages on both device 116 as well as on any other devices that the user may have that includes a copy of the secure communication application, such as a laptop. In some embodiments, client devices 116 and 118 may be the users' personal devices (i.e. a bring your own device (BYOD) scenario). Alternatively, client devices may include other types of devices, such as game consoles, camera/video recorders, video players (e.g., incorporating DVD, Blu-ray, Red Laser, Optical, and/or streaming technologies), smart TVs, and other network-connected appliances, as applicable.

Communications between users of client devices 116 and 118 may be exchanged via network 112. Network 112 may include various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing.

As will be described in greater detail below, processor 102 may perform a plurality of tasks on behalf of secure communication platform 120. Furthermore, whenever platform 120 is described as performing a task, either a single component or a subset of components or all components of platform 120 or enterprise server 100 may cooperate to perform the task. For example, platform 120 may designate one of the keys in a pool of ECDH public keys received from a user of a device as a "reserve" key. Another task performed by platform 120 may include facilitating the addition of new keys to a user's pool of public keys as they are used. Yet another task performed by platform 120 may include dynamically adjusting the size of a user's pool of public keys as needed.

Figure 2:
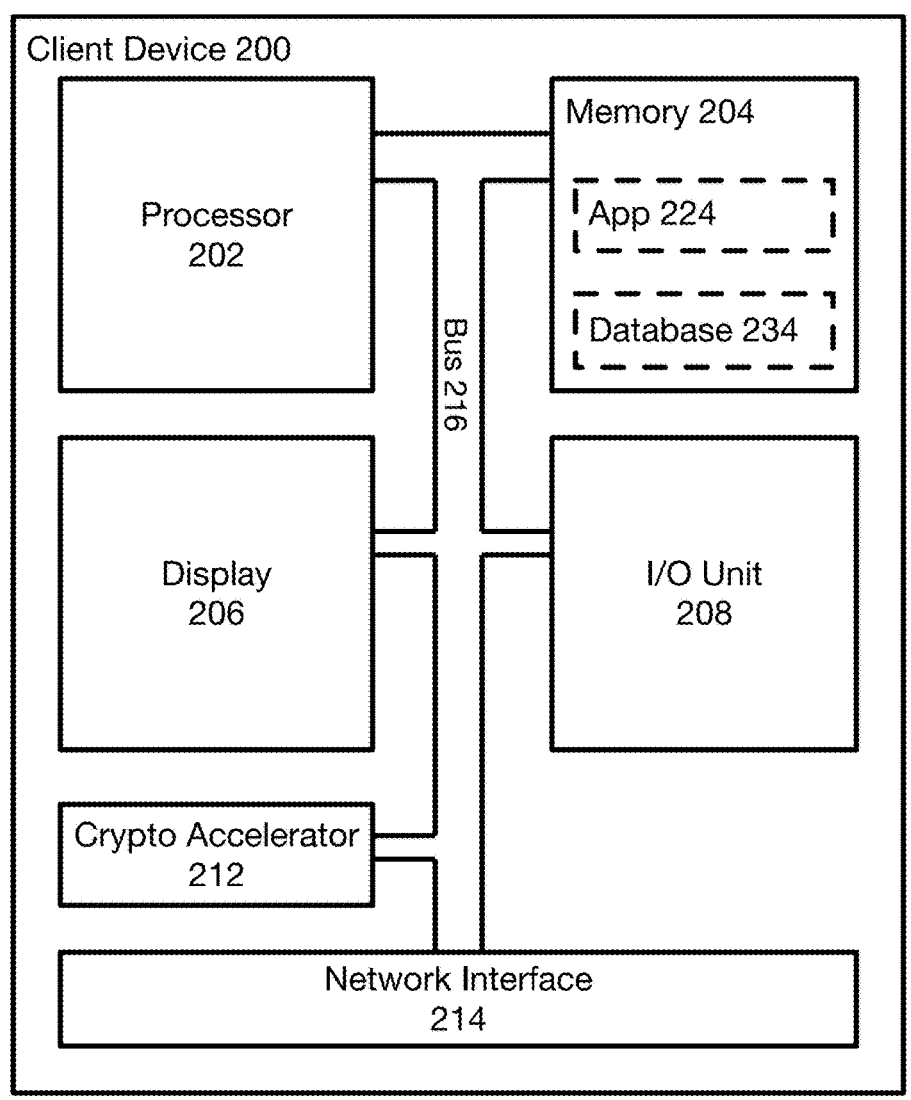
FIG. 2 illustrates a client device that transmits and receives encrypted communications using a secure collaboration application

To make use of the secure communication platform described above, users must download and install the secure communication application on their client device FIG. 2 illustrates an exemplary client device 200 that may access the security platform 120 via a secure collaboration application. In this regard, client device 200 includes a processor 202, a memory 204, a display 206, an I/O unit 208, a cryptographic ("crypto") accelerator 212, and a network interface 214 all interconnected by bus 216.

Processor 202 may be any processor capable of interacting with the components of client device 200. For example, processor 202 may include a processor, multiprocessors, multicore processor, a dedicated controller, such as an ARM processor, an ASIC, or an FPGA, or any combination thereof. Memory 204 may store information accessible by processor 202, including instructions and data that may be executed or otherwise used by the processor 202 and/or crypto accelerator 212. For example, memory 204 may store instructions, such as application 224. In preferred embodiments, application 224 may be a secure collaboration application that provides users with the ability to participate in voice and video calls, share encrypted content, and exchange encrypted communications. Encrypted communications may include direct communications (e.g., one-to-one communications between a sender and receiver), group chats, or secure chat room communications. Data stored by memory 204 may include database 234. Database 234 may be encrypted via an encryption algorithm, such as Advanced Encryption Standard (AES), and a 256-bit key, referred to hereinafter as a local storage key. In some embodiments, database 234 may store information related to secure collaboration application 224. For example, database 234 may index information related to the secure collaboration application, such as key information, user information, friend information, and communications. In this regard, communications transmitted and received by the secure collaboration application, including a message identifier, a hash of the sender's username, a hash of the sender's application identifier, a hash of the receiver's username, a hash of the receiver's application identifier, the communication encryption key, and a timestamp of each communication may be stored in database 234. Accordingly, memory 204 may be any type of media capable of storing the information above, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Further, memory 204 may include short term or temporary storage as well as long term or persistent storage.

Display 206 may be any electronic device capable of visually presenting information. In mobile devices, such as smart phones and tablets, display 206 may be a touchscreen display. Accordingly, display 206 may be integrated with I/O unit 208 to detect user inputs, as well as output data. In computing devices, display 206 may be an output, such as a VGA, DVI, or HDMI output, configured to connect to a monitor. I/O unit 208 may be capable of receiving input from a user. As noted above, the I/O unit 208 may work with touchscreen displays to receive input from a user. Alternatively, the I/O unit may be an interface capable of interacting with input and output devices, such as keyboards, mice, monitors, printers, etc. Additionally, the I/O unit 208 may include at least one accelerometer, a Global Positioning Satellite (GPS) system, a magnetometer, a proximity sensor, an ambient light sensory, a moisture sensor, a gyroscope, etc. to determine the orientation of the device, as well as environmental factors.

Crypto accelerator 212 may be dedicated hardware, software, or any combination thereof that is capable of performing cryptographic operations, such as key generation, random number generation, encryption/decryption, signature generation, signature verification, etc. In preferred embodiments, crypto accelerator 212 is a dedicated processor configured to perform cryptographic operations on behalf of processor 202. In this regard, application 224 may make use of crypto accelerator 212 to provide the secure communication functions described in greater detail below.

Network interface 214 may be dedicated hardware, software, or any combination thereof that is capable of connecting client device 200 to network 112. In this regard, network interface 214 may include various configurations and use various communication protocols including Ethernet, TCP/IP, ATM, cellular and wireless communication protocols (e.g. 802.11, LTE), instant messaging, HTTP and SMTP, and various combinations of the foregoing.

Figure 3:
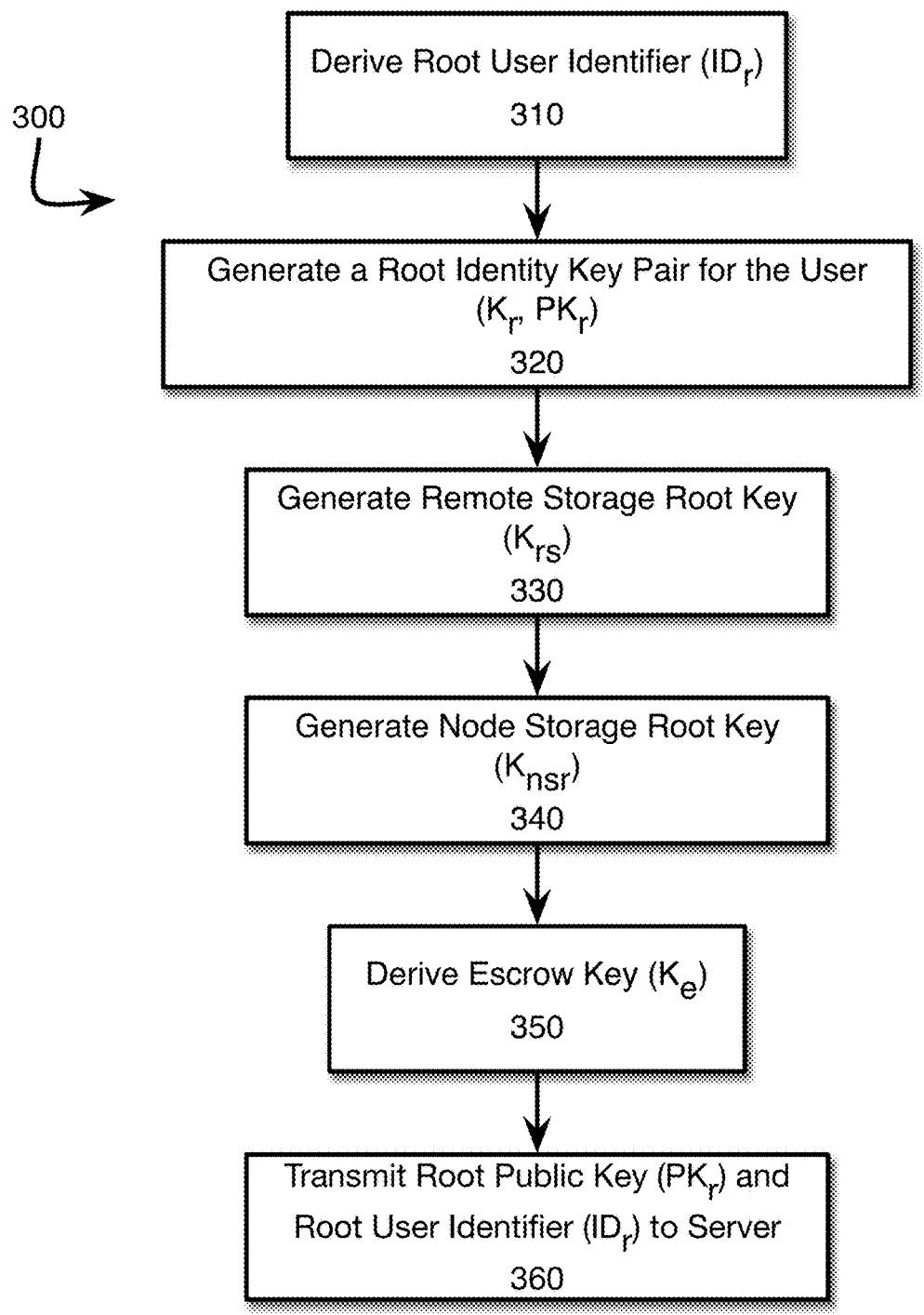
FIG. 3 shows an exemplary process for a user enrolling with a secure communication platform.

After installing the secure communication application, the user must enroll themselves and their first device with the secure communication platform. FIG. 3 illustrates a process 300 for user enrollment with the secure communication platform. Process 300 begins in block 310 with deriving a Root User Identifier ($ID_r$). In preferred embodiments, the Root User Identifier ($ID_r$) is a username the first user negotiates with the secure communication platform. In alternative examples, the Root User Identifier ($ID_r$) may be an identifier assigned by a third party, such as a system administrator. According to these embodiments, the Root User identifier ($ID_r$) may be associated with corporate, enterprise, or government login information. In some examples, the Root User Identifier ($ID_r$) may be a random identifier assigned to the user. The random identifier may be generated by the secure communication application and confirmed by the secure communication platform. Alternatively, the random identifier may be assigned to the user by the secure communication platform.

In block 320, the secure communication application generates a Root Identity Key Pair ($K_r$, $PK_r$) for the user. The Root Identity Key Pair may be a long-term asymmetric key pair generated using an asymmetric derivation function. In preferred embodiments, the Root Identity Key Pair is generated according to elliptic curve cryptography (ECC) using a first P-521 curve. In block 330, the secure communication application generates a Remote Storage Root Key ($K_{rs}$). The Remote Storage Root Key is a symmetric key that is randomly generated by the secure communication application. The Remote Storage Root Key may be used to encrypt account-level backups of the secure communication application. That is, account information may be encrypted with the Remote Storage Root Key using any symmetric encryption algorithm, such as AES-GCM, and stored on the secure communication platform. Next, the secure communication application generates a Node Storage Root Key ($K_{nsr}$) in block 340. The Node Storage Root key is randomly generated and used to encrypt data stored on the user's device. Data stored on the user device may be encrypted according to any symmetric encryption algorithm, preferably AES-GCM. In block 350, the secure communication application derives an Escrow Key ($K_e$). The Escrow Key is randomly generated. As explained in greater detail below, the escrow key is used to encrypt user information, including a plurality of keys that are used to identify the user, that is uploaded to and stored on the secure communication platform. User enrollment is completed in block 360 when the secure communication application transmits the Root Public Key ($PK_r$) and the Root User Identifier ($ID_r$) to the secure communication platform. In response to receiving the Root Public Key ($PK_r$) and the Root User Identifier ($ID_r$), the secure communication platform creates a new entry in database 130 for the user.

Figure 4:
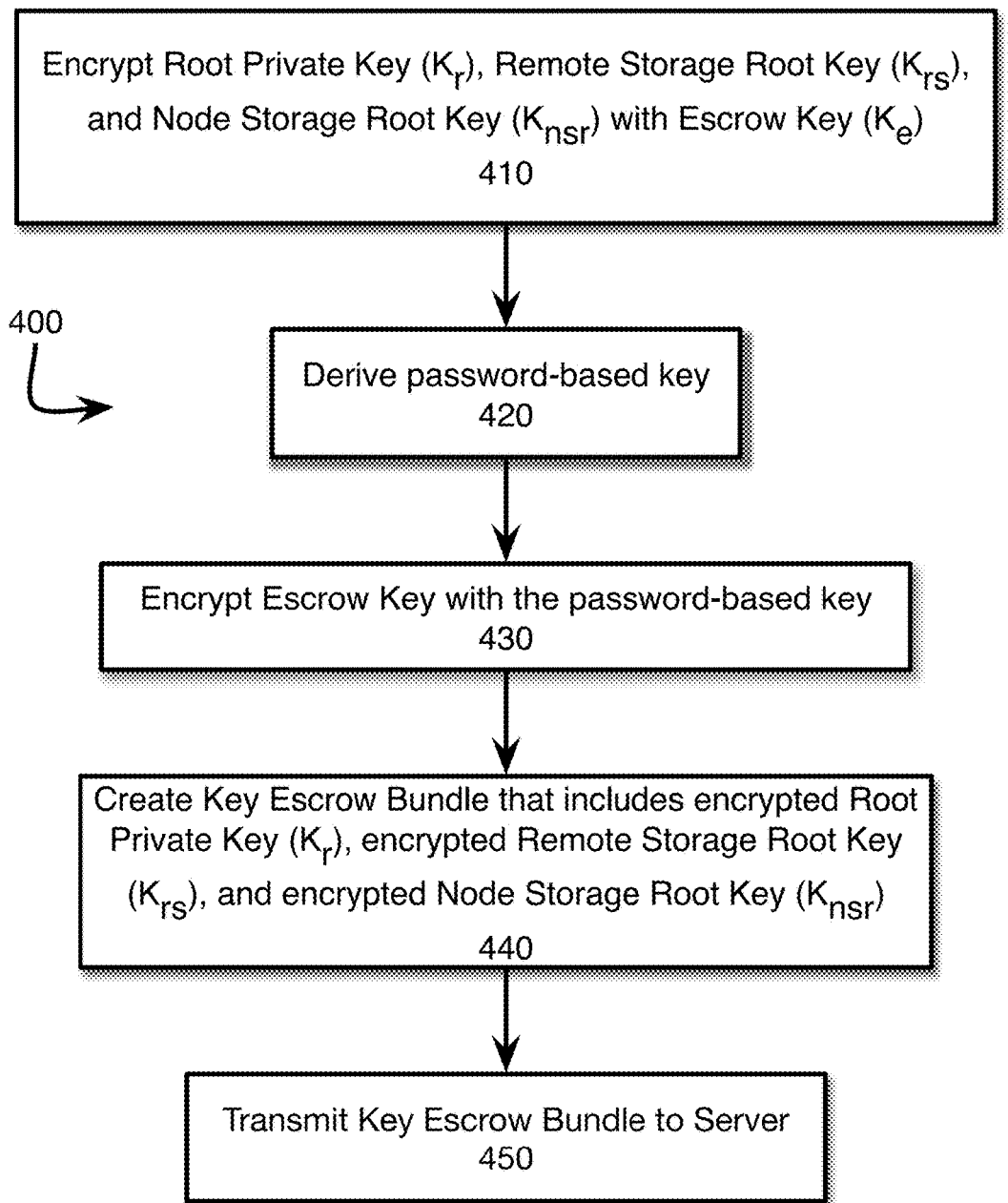
FIG. 4 illustrates an exemplary process for creating a key escrow bundle and storing the key escrow bundle on a server.

In instances where the user has multiple devices or replaces their device, there is a need to securely transfer the keys that identify the user to the subsequent devices. FIG. 4 shows a process 400 for securely uploading those keys to the secure communication platform. In block 410, the Root Private Key ($K_r$), the Remote Storage Key ($K_{rs}$), and the Node Storage Root Key ($K_{nsr}$) are encrypted with the Escrow Key ($K_e$). Preferably, the Root Private Key ($K_r$), the Remote Storage Key ($K_{rs}$), and the Node Storage Root Key ($K_{nsr}$) are encrypted using a symmetric encryption algorithm, such as AES-GCM. In block 420, the secure communication application derives a key from the user's password. The password-based key is generated using a password-base key derivation function, such as scrypt. In block 430, the Escrow Key is encrypted with the derived password-based key. In block 440, the secure communication application creates a Key Escrow Bundle that includes the encrypted Root Private Key, the encrypted Remote Storage Key ($K_{rs}$), and the encrypted Node Storage Root Key. According to some embodiments, the encrypted Escrow Key may be included in the Key Escrow Bundle generated by the secure communication application and uploaded to the secure communication platform. Alternatively, the encrypted escrow key may be stored locally on the user's device, on a non-transitory computer-readable medium, or with a third-party repository. In block 450, the Key Escrow Bundle is transmitted to the server. On the server, the Key Escrow Bundle is stored in the database of the secure communication platform, where it is associated with the user's profile and made available upon request from the user. As will be discussed in greater detail below, subsequent installations of the secure communication application may request the Key Escrow Bundle from the server to provision the subsequent installation with the user's keys. In more secure implementations, block 450 may be skipped.

In this regard, the user must transfer the Key Escrow Bundle to subsequent installations. While this may be more difficult to implement, it would provide a greater degree of security.

Figure 5:
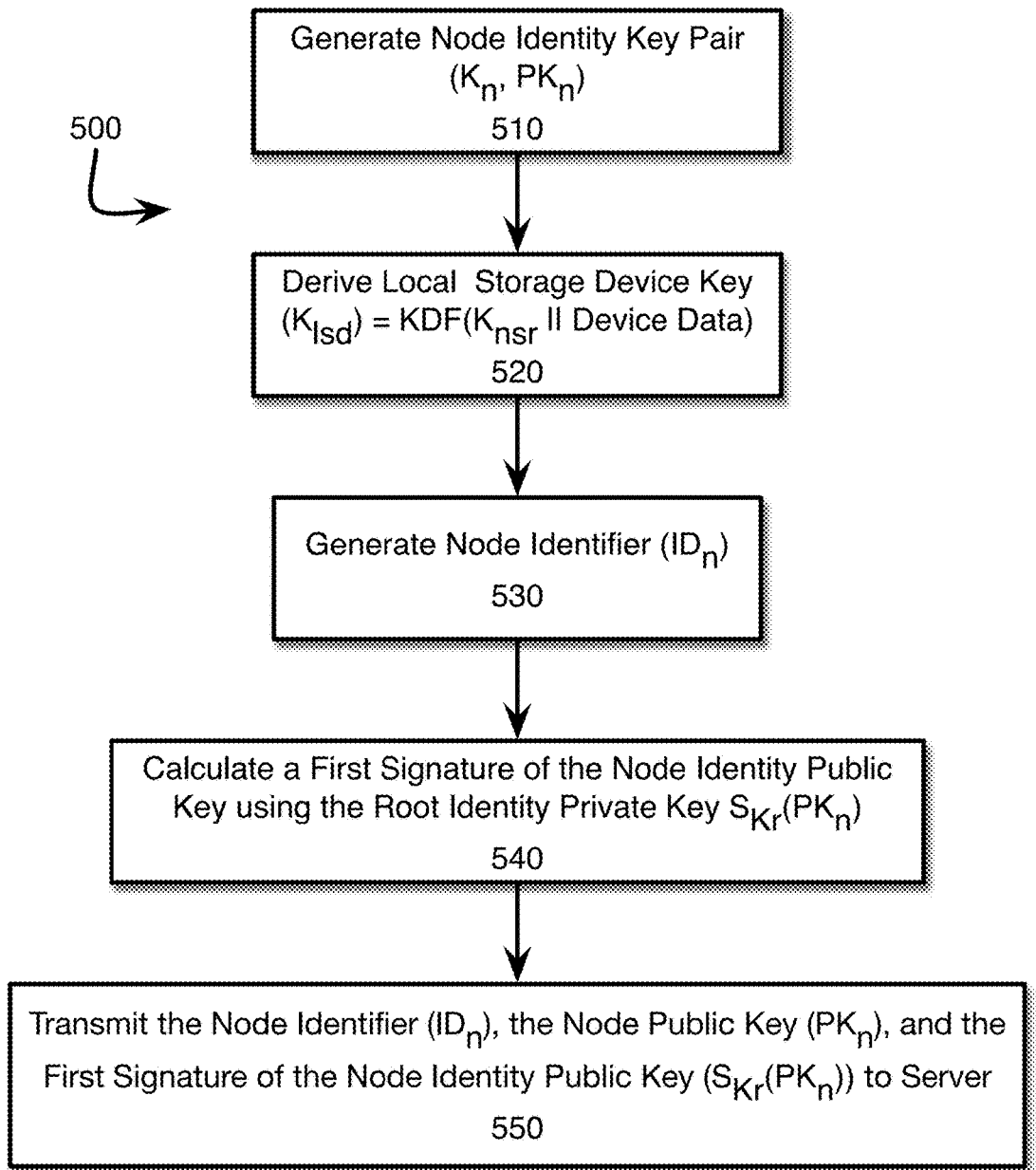
FIG. 5 illustrates an example for enrolling a device with the secure communication platform.

As noted above, part of the enrollment process includes enrolling the user's device with the secure communication platform. Device enrollment occurs any time a user logs in to the secure communication application on a new device, including on the first device after user enrollment occurs. FIG. 5 illustrates an example process 500 for enrolling a device with the secure communication platform.

Device enrollment begins in block 510 where the secure communication application generates a Node Identity Key Pair ($K_n$, $PK_n$). The Node Identity Key Pair may be a long-term asymmetric key pair generated using an asymmetric derivation function. In preferred embodiments, the Node Identity Key Pair is generated according to ECC using a second P-521 curve. The Node Identity Key Pair is unique to the instance of the secure communication application. In this regard, if the user has installed the secure communication application on several devices, each device will have its own unique Node Identity Key Pair, while the Root Identity Key Pair will be the same for each installation.

In block 520, the secure communication application derives a Local Storage Device Key ($K_{lsd}$). The Local Storage Device Key protects data stored locally on the user's device via symmetric encryption. In this regard, the Local Storage Device Key is generated by combining the Node Storage Root Key and device data through a key derivation function. In preferred embodiments, the key derivation function is an HMAC key derivation function with SHA-256 as the underlying hash function. In subsequent installations, the secure communication application obtains the Node Storage Root Key from the secure communication platform, as discussed in greater detail below. Device data includes device-specific data and/or identifiers derived from installed hardware or operating system sources that are unique and constant across application installs. For example, device data may include hard drive identifiers, motherboard identifiers, CPU identifiers, and MAC addresses for wireless, LAN, Bluetooth, and optical cards, configuration information, or a combination of the foregoing.

In block 530, the secure communication application generates a Node Identifier ($ID_n$). The node identifier is a random identifier that is generated by hashing a set of pseudorandom bytes using SHA256. The node identifier is used by the secure communication platform to identify the secure communication application and the device with which it is associated. In block 540, the secure communication application generates a first signature of the Node identity Public Key using the Root Identity Private Key. In preferred embodiments, the secure communication application generates the signature according to Elliptic Curve Digital Signature Algorithm (ECDSA). In block 550, the Node Identifier ($ID_n$) the Node Public Key ($PK_n$), and the First Signature of the Node Identity Public Key ($S_{Kr}(PK_n)$) are transmitted to the server. The secure communication platform stores the Node Identifier ($ID_n$), the Node Public Key ($PK_n$), and the First Signature of the Node Identity Public Key ($S_{Kr}(PK_n)$) within the user's profile on the secure communication platform.

Figure 6:
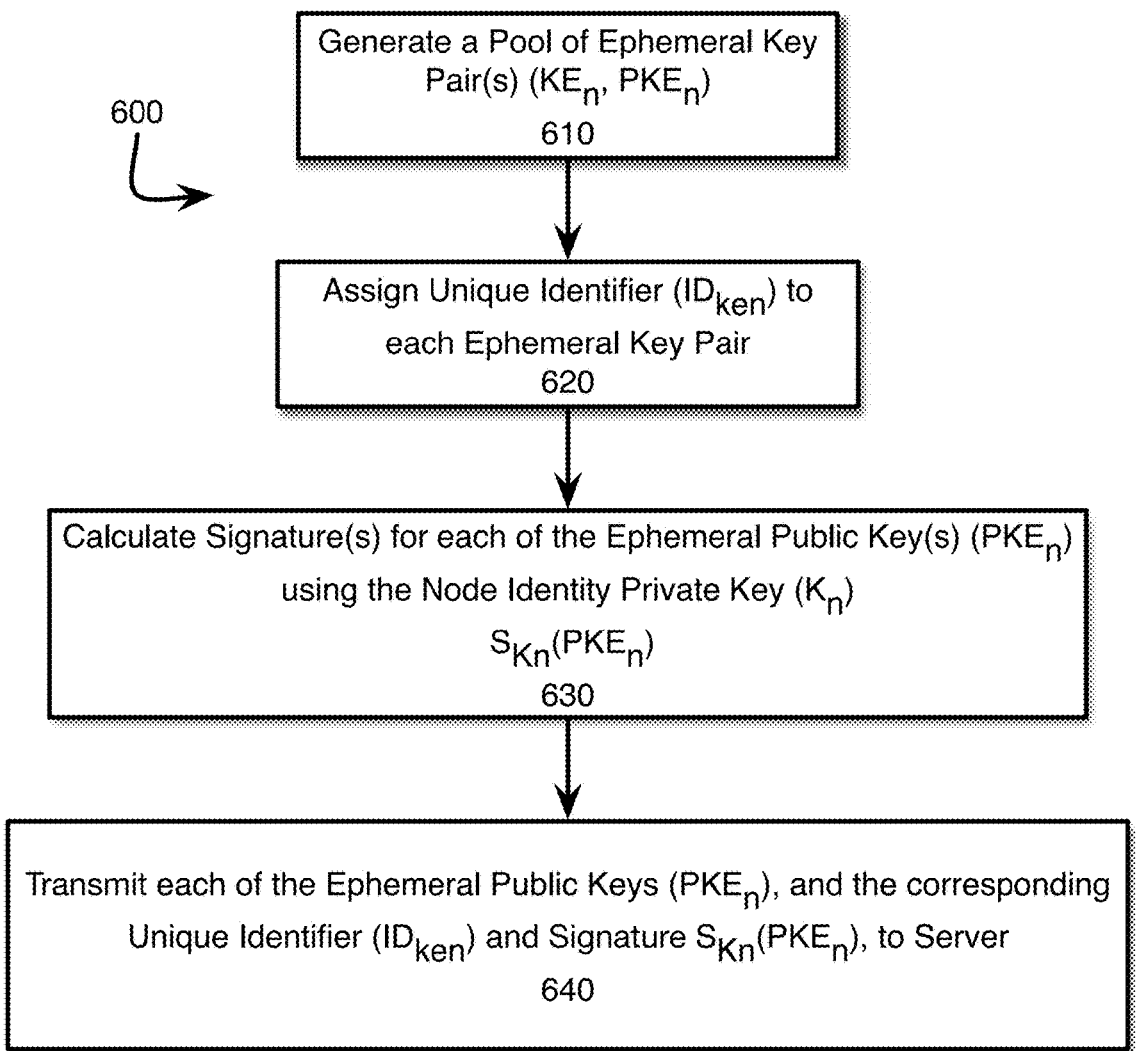
FIG. 6 shows an example of a process for generating a pool of ephemeral keys as part of a key agreement protocol.

After both user and device enrollment have been completed, each instance of the secure communication application creates a pool of asymmetric key pairs. These key pairs are used as part of a key agreement protocol and enable the secure communication application to begin receiving encrypted communications. As the secure communication application begins receiving encrypted communications, the pool of asymmetric key pairs will become depleted and need to be replenished. FIG. 6 shows a method 600 for populating the pool of ephemeral asymmetric key pairs.

In block 610, the secure communication application generates a pool of ephemeral, asymmetric key pairs ($KE_n$ and $PKE_n$). In preferred embodiments, the ephemeral asymmetric key pairs are generated according to ECC according to a third P-521 curve. In block 620, a unique identifier ($ID_{ken}$) is assigned to each key pair ($KE_n$ and $PKE_n$). Next, in block 630, the secure communication application calculates a signature for each of the Ephemeral Public Keys ($PKE_n$) using the Node Identity Private Key ($K_n$). The signatures for each ephemeral public key may be generated according to any standard signature generation algorithm, including ECDSA. In block 640, each of the ephemeral public keys ($PKE_n$), along with its unique identifier and corresponding signature, are uploaded to the server. Accordingly, the server stores the pool of ephemeral public keys in the user's profile on the secure communication platform. The corresponding pool of ephemeral private keys are encrypted with the Local Storage Device Key and are stored securely, along with their assigned unique identifiers, on the user's device.

As noted above, the process 600 is initially performed after the user's first user enrollment and device enrollment. The process 600 is repeated for each new device enrollment. Finally, the method shown in FIG. 6 may be repeated as necessary as the pool of asymmetric keys becomes depleted. As described in greater detail below, when a sending secure communication application uses one of the public keys, the secure communication platform removes the public key from the pool of available keys on the secure communication platform. In the event the pool is exhausted, the last key in the pool will be re-used until the pool can be replenished.

Figure 7:
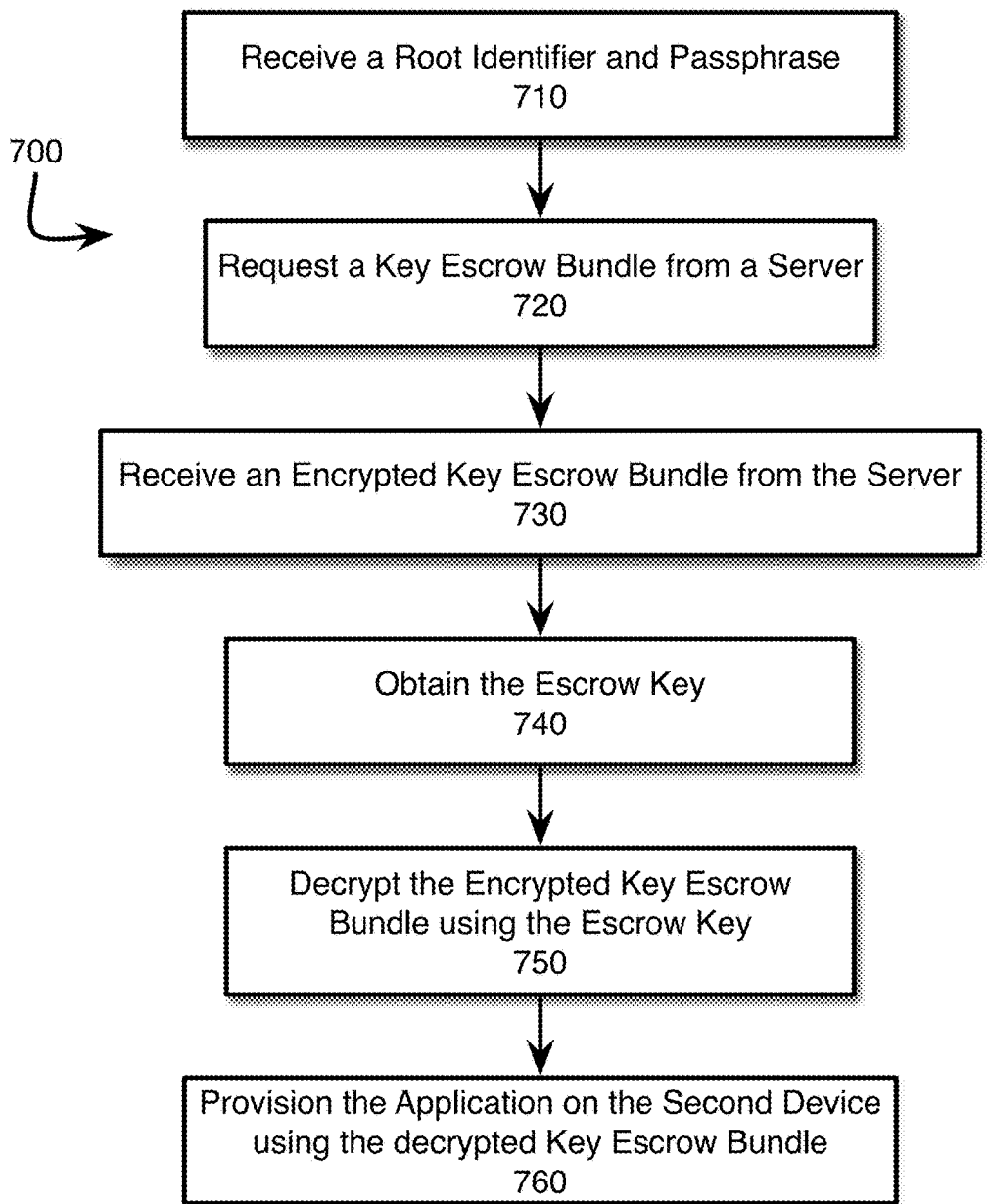
FIG. 7 illustrates an example of a process for provisioning a secondary device.

As discussed above, a user may download and install the secure communication application on one or more secondary devices. In accordance with the encryption techniques described herein, the user will have to configure the one or more second devices with root identifiers and keys created during the user's initial enrollments for the user and their first device. FIG. 7 illustrates a process for provisioning a secondary device with one or more root identifiers and keys.

After downloading the secure communication application to their secondary device, a user enters their root identifier (e.g. username) and passphrase. In block 710, the secure communication application receives the root identifier and passphrase. In block 720, the secure communication application requests a Key Escrow Bundle from the secure communication platform. The request for the Key Escrow Bundle may include the root identifier, or some other unique identifier, to allow the secure communication platform to search through its database to determine if a Key Escrow Bundle exists. If the Key Escrow Bundle is not present in the database, the secure communication platform notifies the secure communication application that it does not exist and requests that the secure communication application provide a Key Escrow Bundle. In this regard, the secure communication application follows the techniques described above. However, if a Key Escrow Bundle is stored on the server, the secure communication application receives an encrypted Key Escrow Bundle from the server in block 730.

In block 740, the secure communication application obtains the Escrow Key. According to some examples, the Escrow Key is encrypted with a passphrase-derived key and stored on the secure communication platform with the Key Escrow Bundle. The secure communication application derives the passphrase-derived key from the received passphrase, and decrypts the encrypted Escrow Key that was received in the Encrypted Key Escrow Bundle received from the secure communication platform. In other examples, the user may obtain the Escrow Key from their first device. For example, the Escrow Key may be transferred from the first device to the second device via a USB drive. Alternatively, the Escrow Key may be transmitted via a different channel, such as email, text message, or a third-party repository. In these examples, the Escrow Key may be encrypted with the passphrase-derived key before it is transferred from the first device. Accordingly, the second device calculates the password-derived key and decrypts the Escrow Key. This represents an additional security feature against malicious users provisioning the secure communication application for nefarious purposes since only the correct password will be able to decrypt the Escrow Key and use the decrypted Escrow key to decrypt the contents of the Key Escrow Bundle.

In block 750, the secure communication application decrypts the encrypted Key Escrow Bundle using the Escrow Key. The Key Escrow Bundle may be encrypted according to a symmetric encryption algorithm, such as AES. In block 760, the secure communication application on the second device is configured using the information contained in the decrypted Key Escrow Bundle. In this regard, the secure communication application on the second device obtains the Root Private Key ($K_r$), the Remote Storage Root Key ($K_{rs}$), and the Node Storage Root key ($K_{nsr}$) from the decrypted Key Escrow Bundle. After unpacking the Key Escrow Bundle, the secure communication application is able to complete the device enrollment using the information obtained from the decrypted Key Escrow Bundle. This allows for the secure transfer of a plurality of keys from one user device to another that would allow both devices to send and receive secure communications based on the same trusted root identifier. Furthermore, this represents an improvement over prior art systems, which would require the user to generate a new set of private keys for each subsequent installation. Thus, the techniques described herein allowing for a more efficient and secure installation of subsequent applications.

Figure 8A:
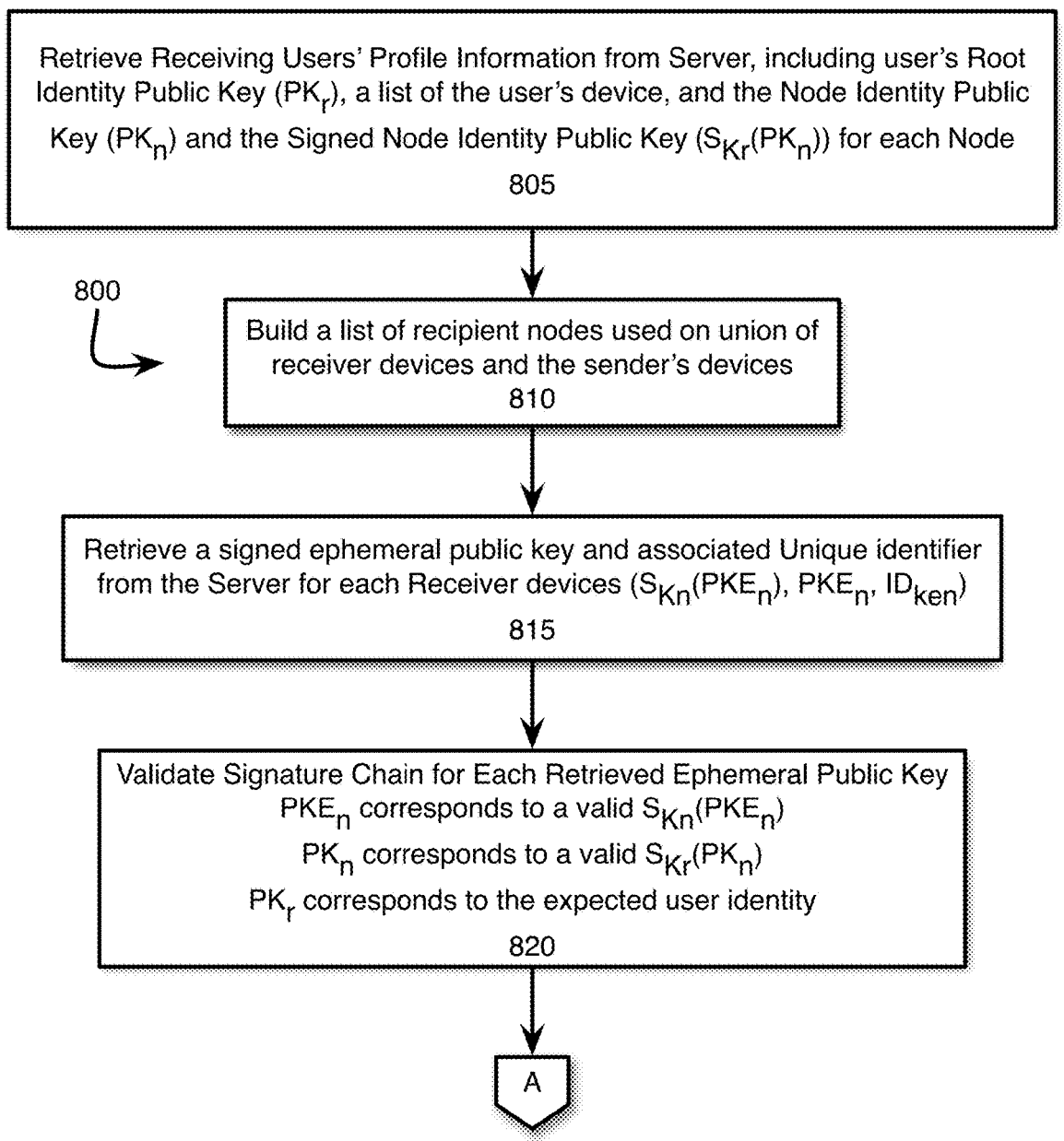
FIGS. 8A-8C illustrate a process for transmitting an encrypted communication according to one embodiment of the disclosure.
Figure 8B:
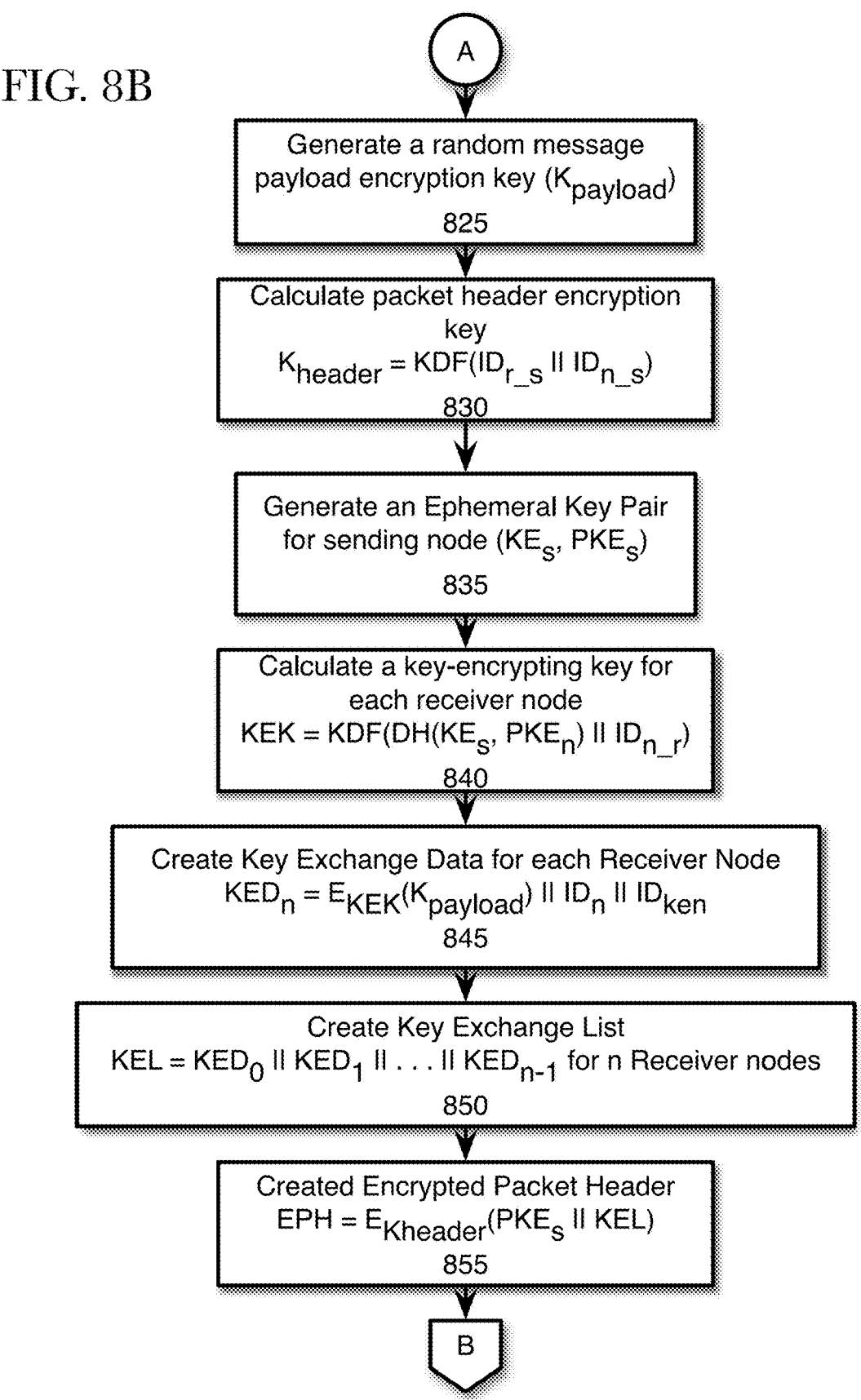
Figure 8C:
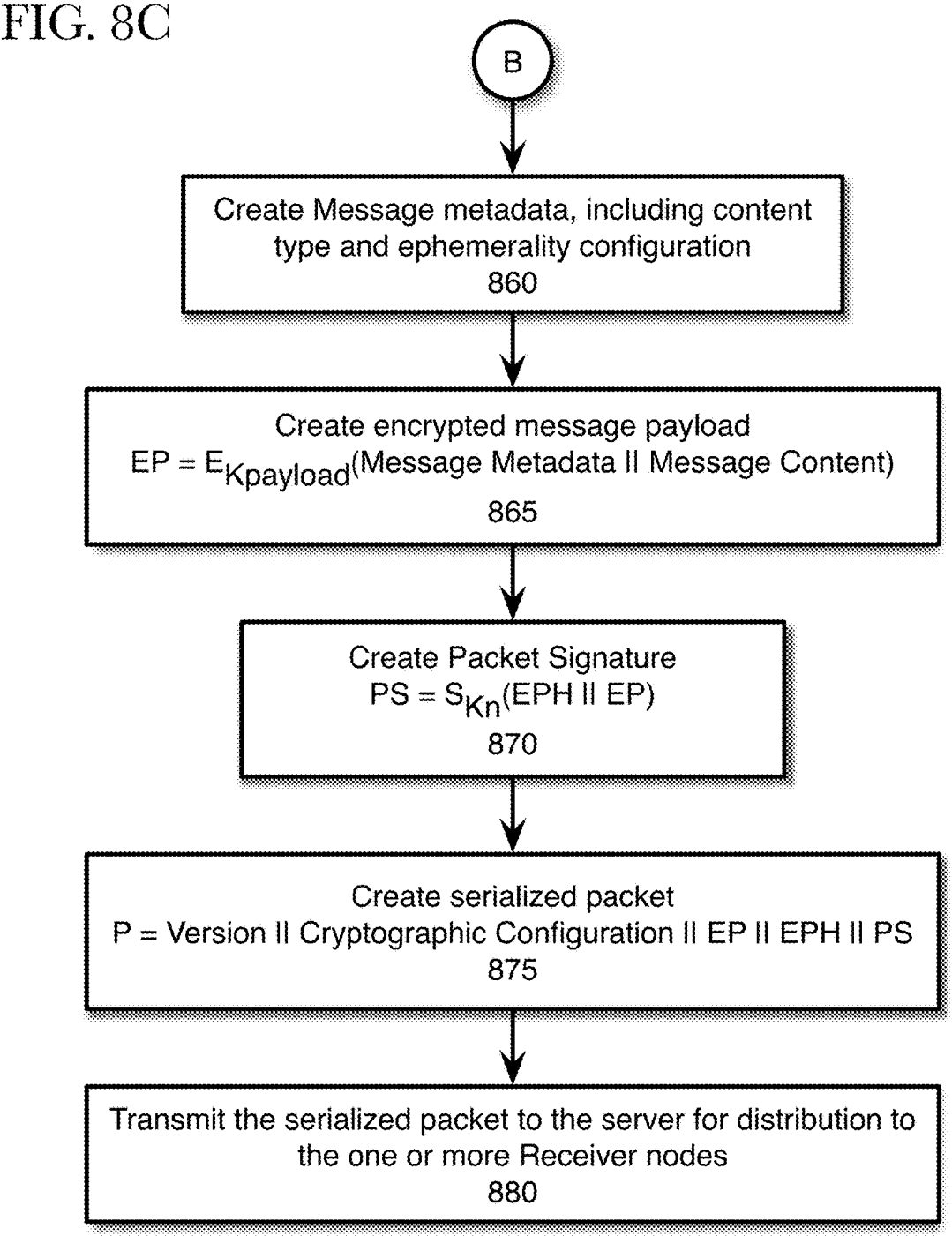

The secure communication provided by the secure communication platform can be better understood as providing node-to-node communication rather than user-to-user communication. As discussed above, a single user may have the secure communication application executing on multiple associated devices. For the purposes of transmitting a communication, each instance of the secure communication application should be considered a node. For example, a first user with two devices who sends a message to a second user with three devices is sending an encrypted message to four nodes—the three device devices associated with the second user, and the first user's second device. FIGS. 8A-8C illustrate a process 800 for transmitting an encrypted communication per this principle.

In block 805, the sending device's secure communication application retrieves one or more receiving users' profile information from the secure communication platform. In this regard, the sending secure communication application may request the receiving users' profile information from the secure communication platform. This may occur, for example, when the sending user begins composing the communication. The user profile information includes the user's Root Identity Public Key ($PK_r$), a list of the user's device nodes, the Node Identity Public Key for each device ($PK_n$), and the Signed Node Identity Public Key ($S_{Kr}(PK_n)$) for each node. Next, the sending secure communication application builds a list of recipient nodes based on a union of the receiving user devices and the sender's devices in block 810. In block 815, the sending secure communication application retrieves a signed ephemeral public key, and its associated unique identifier, from the secure communication platform for each of the receiving devices. According to some embodiments, the signed ephemeral public key and the associated unique identifier may be obtained along with the receiving users' profile information. In block 820, the sending secure communication application validates the signature chain for each ephemeral public key received from the secure communication platform. In this regard, the signature of the ephemeral public key is authenticated according to a signature verification algorithm, such as ECDSA, using the Node Identity Public Key; the signature of the Node Identity Public Key is verified using Root Identity Public Key; and the Root Identity Public Key corresponds to an expected user identity. If the signature chain is invalid, the secure communication application may request the one or more receiving users' profile information from the secure communication platform. Alternatively, the secure communication application may discard the communication and refuse to communicate with the one or more receiving nodes with the invalid signature chain. If the signature chain is valid, then the secure communication application continues preparing the communication to send to the one or more receiver nodes.

In block 825, the sending secure communication application generates a random message payload encryption key ($K_{payload}$). In preferred embodiments, the first message payload encryption key is a 256-bit key generated by applying a key derivation function (e.g. HKDF) to a first set of pseudorandom bytes derived from a sending client's device. The first set of pseudorandom bytes may be derived from ephemeral environmental noise obtained from device drivers and other kernel operations. For example, data from the various sensors (e.g., the at least one accelerometer, Global Positioning Satellite (GPS) system, magnetometer, proximity sensor, ambient light sensor, moisture sensor, and gyroscope) may be used as the first set of pseudorandom bytes.

In block 830, the sending secure communication application calculates a packet header encryption key ($K_{header}$). In preferred embodiments, the packet header encryption key is calculated by combining the Root Identifier with the Node Identifier of the secure communication application and passing both sets of data through a key derivation function. In block 835, the sending secure communication application generates an ephemeral key pair ($KE_s$, $PKE_s$). In block 840, the sending secure communication application calculates a key-encrypting key (KEK) for each receiver node. The key-encrypting key is calculated according to:

$$KEK=KDF(DH(KE_s,PKE_n)\|ID_{n\_r})$$

In this regard, the sending secure communication application derives a shared secret using the ephemeral private key the sending secure communication application generated and the receiving node's ephemeral public key received from the secure communication platform. In preferred embodiments, the shard secret is derived according to Diffie-Hellman. The shared secret and the Node Identifier of the receiving node are inputted into a key derivation function to derive a key-encrypting key that effectively binds the communication to the receiver's secure collaboration application. This improves security by allowing only the receiving node to access the communication. That is, a receiver would not be able to transfer the communication from one device to another and still be able to decrypt the message since the keys used to generate the key-encrypting key are unique to the specific installation of the secure communication application. Block 840 is repeated for each of the one or more receivers' devices.

After calculating the key-encrypting key for each of the one or more receivers' devices, the sending secure communication application creates key exchange data for each receiver node in block 845. The key exchange data includes the random message payload encryption key ($K_{payload}$) encrypted with the key-encrypting key for a receiver node, the sending node's Node Identifier, and the unique identifier assigned to the receiving node's ephemeral public key ($ID_{ken}$). Accordingly, block 845 will be repeated for each of the receiver nodes.

In block 850, the sending secure communication application creates a Key Exchange List for each receiver node. For example, the secure communication application may combine each of the Key Exchange Data blobs of information generated in block 845 to create the Key Exchange List. In block 855, the sending secure communication application generates an encrypted packet header. In this regard, the sending secure communication application creates an encrypted packet header by encrypting the Key Exchange List and the sender's ephemeral public key with the header encryption key. In preferred embodiments, the key exchange list and the sender's ephemeral public key are encrypted via a symmetric encryption algorithm, such as AES.

After generating the encrypted packet header, the sending secure communication application begins preparing the packet content for transmission. In block 860, the sending secure communication application creates communication metadata. The communication metadata may identify the type of content included in the communication. Additionally, the communication metadata may include ephemerality of the communication. That is, the sender may specify a time-to-live for the communication. After the time-to-live has expired, the receiving node will not be able to access the communication.

In block 865, the sending secure communication application creates an encrypted message payload. The encrypted message payload is created by encrypting, via a symmetric encryption algorithm, the message metadata and the message content using the random message payload encryption key. In block 870, the sending secure communication algorithm creates a packet signature. The packet signature is generated by applying the Node Identity Private key to the encrypted packet header and the encrypted message payload in accordance with a signature generation algorithm. In block 875, the sending secure communication application creates a serialized packet that includes version information, cryptographic configuration information, the encrypted packet, the encrypted packet header, and the packet signature. In block 880, the sending secure communication application transmits the serialized packet to the secure communication platform for distribution to the one or more receiver nodes. In this way, the secure communication platform receives a single packet and distributes the single packet to the one or more receiver nodes.

Figure 9A:
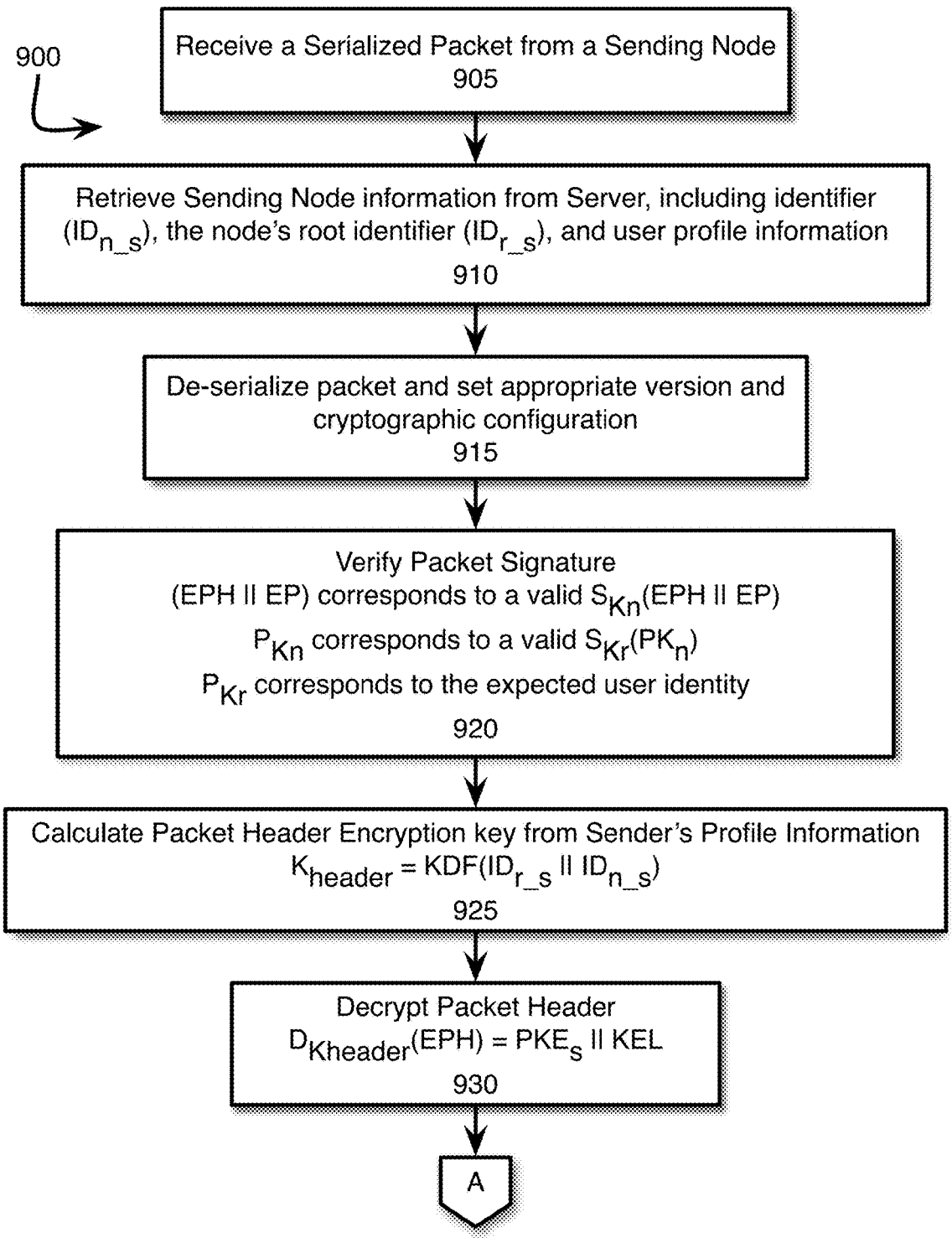
FIGS. 9A and 9B illustrate a process for receiving and decrypting an encrypted communication according to one embodiment of the disclosure.
Figure 9B:
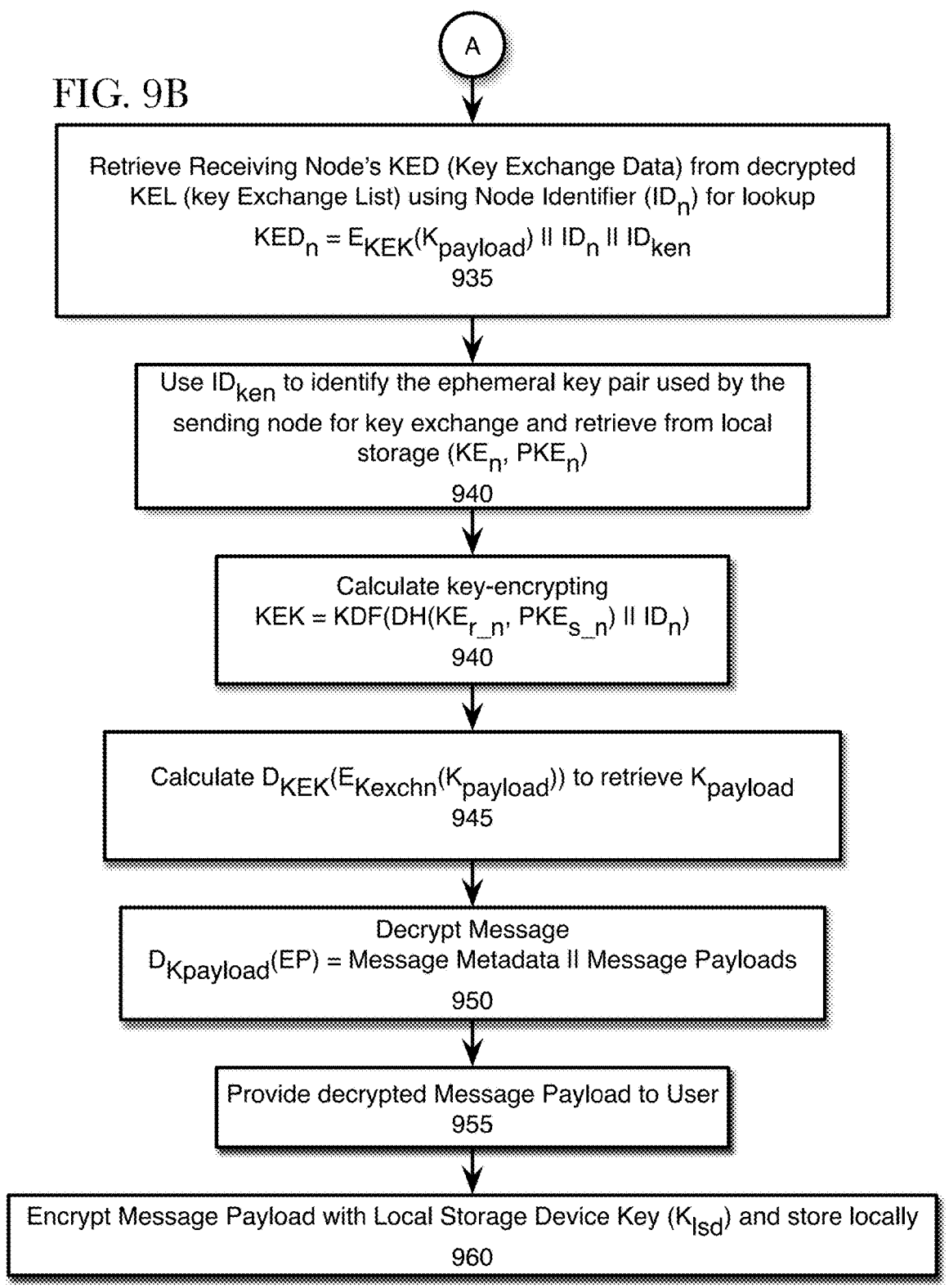

The secure communication platform provides each of the one or more receiving nodes with an alert, such as a push notification, that they have received a new communication. The secure communication applications contact the secure communication platform and download the new communication to their devices. FIGS. 9A and 9B illustrate a method 900 for receiving and decrypting an encrypted communication on a receiving node.

In block 905, the receiver node receives a serialized packet from a sending node. Receiving the serialized packet includes retrieving the serialized packet from the secure communication platform in response to receiving an alert or notification. Additionally, the receiver node is responsible for identifying the appropriate key material to decrypt the communication content. To this end, the receiving node obtains information about the sending node from the secure communication platform in block 910. The information includes the identifier of the sending node ($ID_{n\_s}$), the identifier of that node's root ($ID_{r\_s}$), and user profile information of the sending node.

After obtaining the communication and information about the sender, the secure communication application on the receiving node de-serializes the packet and sets the appropriate version and cryptographic configuration in block 915. In block 920, the secure communication application on the receiving node verifies the packet signature. In this regard, the signature of the encrypted packet header and encrypted packet payload is authenticated; the signature of the Node Identity Public Key is verified using Root Identity Public Key; and the Root Identity Public Key corresponds to an expected user identity. If any of the signatures are invalid, the secure communication application on the receiving node may cease decrypting the received packet and discard it. Alternatively, the secure communication application on the receiving node may continue the decryption process and provide a notification to the user that the content of the communication could not be verified. If the signatures are validated, then the receiving node's secure communication application continues the decryption process.

In block 925, the receiving node's secure communication application calculates the packet header encryption key ($K_{header}$) from the sender's profile information received from the secure communication platform. As discussed above, the packet header encryption key is derived from the sender's root identifier ($ID_{r\_s}$) and the sender's node identifier ($ID_{n\_s}$). In block 930, the secure communication application of the receiving node decrypts the packet header using the derived packet header encryption key to obtain the sender's ephemeral public key ($PKE_s$) and the Key Exchange List.

In block 935, the receiving node's secure communication application uses its Node Identifier ($ID_{n\_r}$) to retrieve the Key Exchange Data from the decrypted Key Exchange List. Specifically, the receiving node obtains the encrypted payload key ($E_{KEK}(K_{payload})$), the receiving node's Node Identifier ($ID_n$), and the unique identifier of the receiving node's ephemeral public key ($ID_{ken}$). In block 940, the receiving node's secure communication application uses the unique identifier ($ID_{ken}$) to identify and retrieve the ephemeral key pair ($KE_n$, $PKE_n$) used by the sending node for the key exchange from local storage on the receiving node.

After obtaining the ephemeral key pair from storage, the secure communication application on the receiving node calculates the key-encrypting key in block 940. Specifically, the receiving node calculates a shared secret using the receiving node's ephemeral private key and the sending node's ephemeral public key. The shared secret and the receiving node's Node Identifier are inputted to a key derivation function to generate the key-encrypting key. In block 945, the receiving node's secure communication application decrypts the encrypted payload encryption key. In block 950, the decrypted payload encryption key is used to decrypt the message. In particular, the secure communication application obtains the message metadata and the message content from the decrypted message. In block 955, the receiving node's secure communication application provides the decrypted message to the user. In block 960, the message payload is encrypted with the receiving node's Local Storage Device Key and stored in a local storage on the receiving node.

Short-lived keys, such as the sender and receiver's ephemeral key pairs and the payload encryption key, are deleted shortly after the message content has been decrypted. The secure communication application will carry out actions in accordance with the message metadata. For example, each encrypted message may be associated with an expiration time or Time-to-Live (TTL) value, after which time secure communication applications must delete the message. Accordingly, secure communication applications will enforce the expiration time or TTL value and delete the message after it has expired.

Figure 10:
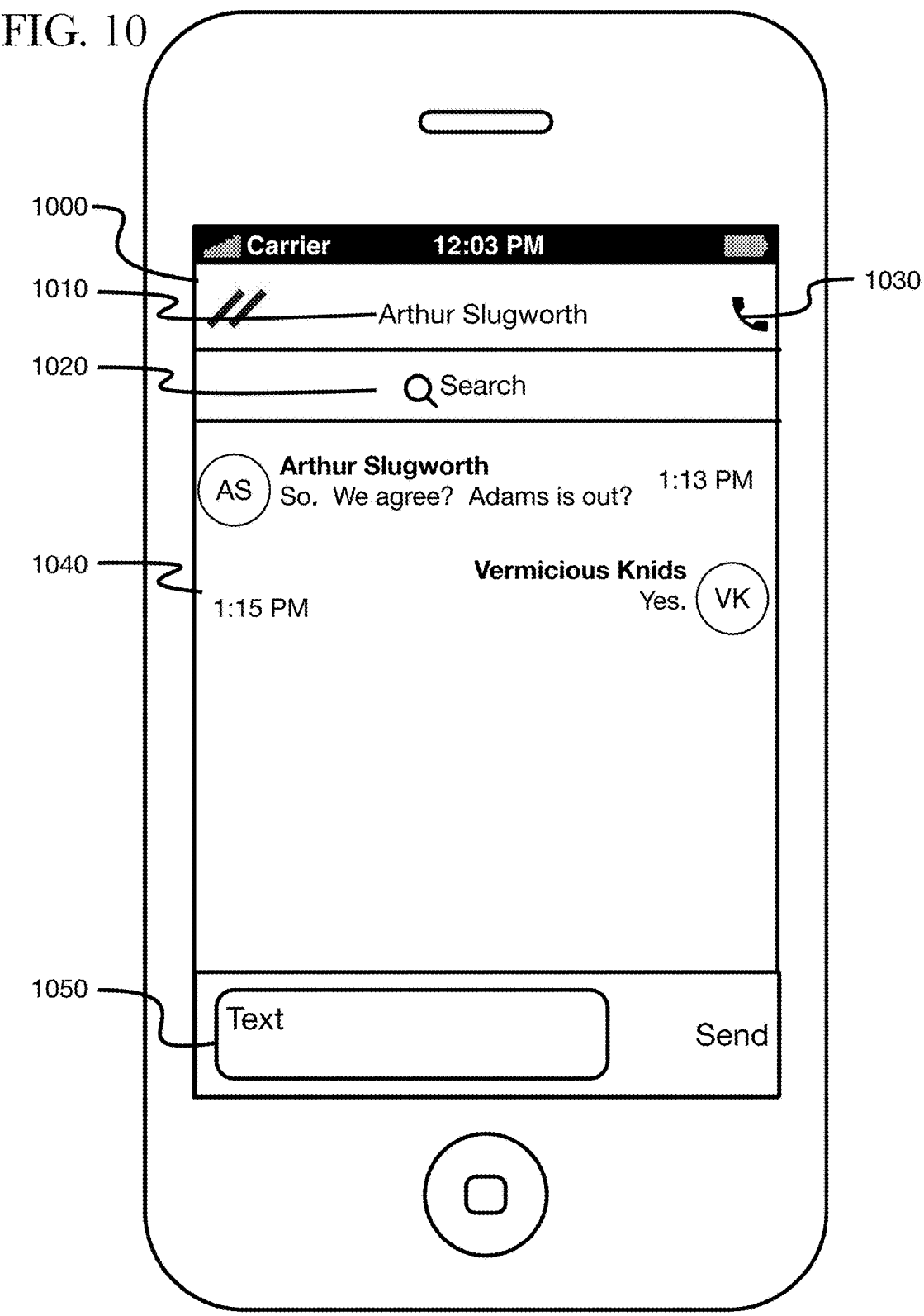
FIG. 10 shows an example of a mobile interface for end-to-end encrypted communications between a first and second user.

FIG. 10 shows an example of a mobile interface 1000 for end-to-end encrypted communications between a first and second user. Interface 1000 includes a title field 1010. When the user is participating in a secure chat room, the title of the secure chat room will be displayed. Similarly, the name of the other participant will be shown when the user is participating in a one-to-one communication. Interface 1000 may include a search field 1020 to provide the user with the ability to perform a text search. Additionally, the interface 1000 may include a call option field 1030 that allows the user to participate in a secure voice or video call. Interface 1000 includes a text window 1140, which displays the incoming and outgoing communications, and a text interface 1150 to enter text and upload files.

Figure 11:
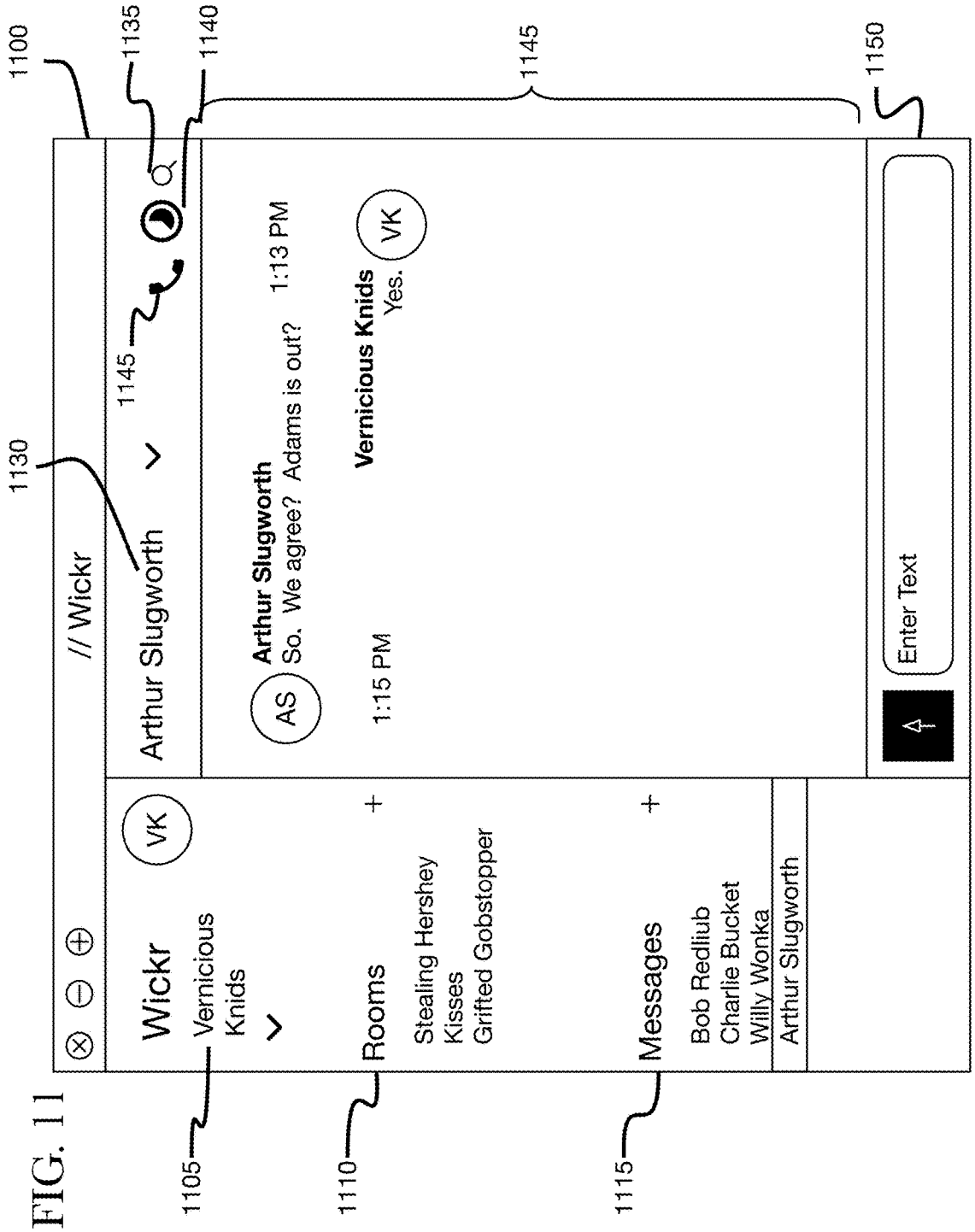
FIG. 11 shows an illustrative example of an interface for an end-to-end encrypted communication between two users

FIG. 11 shows an illustrative example of a desktop interface 1100 for an end-to-end encrypted communication between two users. The interface room 1100 displays user information in field 1105. In this regard, interface 1100 belongs to Vernicious Knids as indicated by field 1105. Field 1110 displays the secure chat rooms that the user is a participant in, while field 1115 illustrates the one-to-one communications of the user. As illustrated, the Arthur Slugworth name is highlighted, indicating that the one-to-one communication with Arthur Slugworth is displayed. This is also displayed in the header field 1130, which displays the name of the other user. If a secure chat room was selected, header field 1130 would display the name of the secure chat room. Additionally, interface 1100 may include a search field 835, the TTL status in field 1140, and a call option field 1145. Search field 1135 provides users with the ability to do a text search for communications made in interface 1100. The TTL status field 1140 allows a user to change the expiration time of message sent in the secure chat room. The call option field 1145 permits the user to participate in an encrypted audio or video call. Interface 1100 also includes a text window 1145, which displays the incoming and outgoing communications. Finally, interface 1100 includes window 1150 to allow the user to enter text and upload files.

Although the foregoing embodiments have been described in some detail for purposes of clarity of understanding, the present disclosure is not limited to the details provided. There are many alternative ways of implementing the present disclosure. The disclosed embodiments are illustrative and not restrictive.

What is claimed is:
1. A system, comprising:
    a processor configured to:
        derive a root private key, a remote storage root key, a node storage root key, and an escrow key during an enrollment process;

encrypt the root private key, the remote storage root key, and the node storage root key with the escrow key;
derive a password-based key;
encrypt the escrow key with the password based key;
create a key escrow bundle, wherein the key escrow bundle includes the encrypted root private key, the encrypted remote storage root key, and the encrypted node storage root key; and
transmit the key escrow bundle to a first server; and
a memory coupled to the processor and configured to provide the processor with instructions.

2. The system of claim 1, wherein the encrypted escrow key is included in the key escrow bundle transmitted to the server.

3. The system of claim 1, wherein the enrollment process is a user enrollment process.

4. The system of claim 1, wherein the processor is configured to:
derive the password-based key using a password-based key derivation function.

5. The system of claim 1, wherein the processor is configured to:
derive a root user identifier and a root identity key pair.

6. The system of claim 5, wherein the processor is configured to:
transmit the root user identifier and a root public key from the root identity key pair to the first server.

7. A method comprising:
deriving, on a first device, a root private key, a remote storage root key, a node storage root key, and an escrow key during an enrollment process;
encrypting, by the first device, the root private key, the remote storage root key, and the node storage root key with the escrow key;
deriving, on the first device, a password-based key;
encrypting, by the first device, the escrow key with the password based key;
creating, on the first device, a key escrow bundle, wherein the key escrow bundle includes the encrypted root private key, the encrypted remote storage root key, and the encrypted node storage root key; and
transmitting, by the first device, the key escrow bundle to a first server.

8. The method of claim 7, wherein the encrypted escrow key is included in the key escrow bundle transmitted to the server.

9. The method of claim 7, wherein the enrollment process is a user enrollment process.

10. The method of claim 7, further comprising:
deriving the password-based key using a password-based key derivation function.

11. The method of claim 7, further comprising:
deriving, by the first device, a root user identifier and a root identity key pair.

12. The method of claim 11, further comprising:
transmitting, by the first device, the root user identifier and a root public key from the root identity key pair to the first server.

13. A non-transitory computer-readable medium comprising instructions that when, executed by at least one processor, perform the steps of:
deriving a root private key, a remote storage root key, a node storage root key, and an escrow key during an enrollment process;
encrypting the root private key, the remote storage root key, and the node storage root key with the escrow key;
deriving a password-based key;
encrypting the escrow key with the password based key;
creating a key escrow bundle, wherein the key escrow bundle includes the encrypted root private key, the encrypted remote storage root key, and the encrypted node storage root key; and
transmitting the key escrow bundle to a first server.

14. The non-transitory computer-readable medium of claim 13, wherein the encrypted escrow key is included in the key escrow bundle transmitted to the server.

15. The non-transitory computer-readable medium of claim 13, wherein the enrollment process is a user enrollment process.

16. The non-transitory computer-readable medium of claim 13, comprising instructions for:
deriving the password-based key using a password-based key derivation function.

17. The non-transitory computer-readable medium of claim 13, comprising instructions for:
deriving a root user identifier and a root identity key pair.

18. The non-transitory computer-readable medium of claim 17, comprising instructions for:
transmitting the root user identifier and a root public key from the root identity key pair to the first server.

* * * * *